United States Patent
Govindaraj et al.

(10) Patent No.: US 7,996,093 B2
(45) Date of Patent: Aug. 9, 2011

(54) AUTOMATIC CONTROLLER RELATIONSHIP RESOLUTION

(75) Inventors: Subbian Govindaraj, Solon, OH (US); Raymond J. Staron, Chagrin Falls, OH (US); Charles Martin Rischar, Chardon, OH (US); Kenwood H. Hall, Hudson, OH (US); David A. Vasko, Solon, OH (US); Robert J. Kretschmann, Bay Village, OH (US); Michael D. Kalan, Highland Heights, OH (US); Paul R. D'Mura, Glendale, AZ (US); Taryl J. Jasper, South Euclid, OH (US); Eugene Liberman, Rocky River, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 337 days.

(21) Appl. No.: 12/019,463

(22) Filed: Jan. 24, 2008

(65) Prior Publication Data
US 2009/0192645 A1 Jul. 30, 2009

(51) Int. Cl.
*G06F 9/44* (2006.01)
(52) U.S. Cl. .............. 700/1; 717/162; 719/332
(58) Field of Classification Search .......... 700/1, 2, 700/18–20, 86, 87; 709/220–225, 248; 711/204–207; 707/10; 712/216–220; 717/110, 717/111, 120, 121, 162; 719/331, 332
See application file for complete search history.

(56) References Cited

U.S. PATENT DOCUMENTS

| | | | |
|---|---|---|---|
| 4,389,706 A | 6/1983 | Gomola et al. | |
| 4,517,637 A | 5/1985 | Cassell | |
| 5,345,586 A | 9/1994 | Hamala et al. | |
| 5,732,086 A * | 3/1998 | Liang et al. ........... | 370/410 |
| 5,975,737 A | 11/1999 | Crater et al. | |
| 6,041,049 A * | 3/2000 | Brady ................... | 370/351 |
| 6,061,740 A * | 5/2000 | Ferguson et al. ...... | 709/246 |
| 6,064,814 A | 5/2000 | Capriles et al. | |
| 6,098,108 A | 8/2000 | Sridhar et al. | |
| 6,151,624 A * | 11/2000 | Teare et al. ............ | 709/217 |
| 6,188,675 B1 * | 2/2001 | Casper et al. ......... | 370/254 |

(Continued)

FOREIGN PATENT DOCUMENTS
EP 1150206 A1 * 10/2001

OTHER PUBLICATIONS
Garcia et al., "A Software Architecture for Industrial Automation," Proc. of the 7th IEEE Internat'l Enterprise Distributed Object Computing Conf., Sep. 16-19, 2003, pp. 315-320.*

*Primary Examiner* — M. N. Von Buhr
(74) *Attorney, Agent, or Firm* — Turocy & Watson LLP; R. Scott Speroff; John M. Miller

(57) ABSTRACT

In an industrial control system, a relatively large number of bindings can permeate between different controllers. As a modification is made in a primary binding, supplemental bindings can be impacted and can become erroneous. The supplemental bindings can be automatically resolved such that they are no longer erroneous. Resolution can take place through access of a distributed directory that holds information related to the different controllers. To lower a likelihood of control system error or failure, the primary binding and supplemental binding can be placed online in synchronization.

26 Claims, 10 Drawing Sheets

U.S. PATENT DOCUMENTS

| | | | |
|---|---|---|---|
| 6,311,179 B1 * | 10/2001 | Agarwal et al. | 1/1 |
| 6,330,006 B1 * | 12/2001 | Goodisman | 715/762 |
| 6,389,416 B1 * | 5/2002 | Agarwal et al. | 1/1 |
| 6,393,459 B1 | 5/2002 | Lurndal | |
| 6,442,584 B1 * | 8/2002 | Kolli et al. | 718/104 |
| 6,529,780 B1 | 3/2003 | Soergel et al. | |
| 6,571,253 B1 * | 5/2003 | Thompson et al. | 1/1 |
| 6,611,525 B1 * | 8/2003 | Natanson et al. | 370/395.53 |
| 6,640,231 B1 * | 10/2003 | Andersen et al. | 1/1 |
| 6,792,607 B1 * | 9/2004 | Burd et al. | 719/316 |
| 6,850,983 B2 * | 2/2005 | Rezaiifar et al. | 709/227 |
| 6,885,644 B1 * | 4/2005 | Knop et al. | 370/254 |
| 7,027,411 B1 * | 4/2006 | Pulsipher et al. | 370/254 |
| 7,047,390 B2 * | 5/2006 | Factor et al. | 711/202 |
| 7,076,786 B2 * | 7/2006 | Burd et al. | 719/316 |
| 7,082,348 B1 | 7/2006 | Dahlquist et al. | |
| 7,089,530 B1 * | 8/2006 | Dardinski et al. | 717/105 |
| 7,106,702 B2 * | 9/2006 | Hua et al. | 370/255 |
| 7,120,690 B1 | 10/2006 | Krishnan et al. | |
| 7,123,974 B1 | 10/2006 | Hamilton | |
| 7,136,911 B1 | 11/2006 | Nakazawa | |
| 7,151,966 B1 | 12/2006 | Baier et al. | |
| 7,191,436 B1 | 3/2007 | Durr et al. | |
| 7,228,185 B2 | 6/2007 | Patz et al. | |
| 7,269,648 B1 * | 9/2007 | Krishnan et al. | 709/224 |
| 7,281,018 B1 * | 10/2007 | Begun et al. | 1/1 |
| 7,293,254 B2 * | 11/2007 | Bloesch et al. | 717/108 |
| 7,308,473 B1 | 12/2007 | Thomas et al. | |
| 7,315,854 B2 | 1/2008 | Kumar | |
| 7,386,856 B2 * | 6/2008 | Need et al. | 719/310 |
| 7,506,050 B2 * | 3/2009 | Glasmann et al. | 709/224 |
| 7,523,129 B1 * | 4/2009 | Bent et al. | 1/1 |
| 7,590,614 B2 * | 9/2009 | Fildebrandt et al. | 1/1 |
| 7,610,387 B1 * | 10/2009 | Liskov et al. | 709/227 |
| 7,640,533 B1 * | 12/2009 | Lottero et al. | 717/108 |
| 7,680,828 B2 * | 3/2010 | Gorelik | 707/763 |
| 7,797,147 B2 * | 9/2010 | Vinberg et al. | 703/22 |
| 2005/0138057 A1 * | 6/2005 | Bender et al. | 707/102 |
| 2008/0288856 A1 * | 11/2008 | Goranson et al. | 715/208 |

* cited by examiner

AUTOMATIC CONTROLLER RELATIONSHIP RESOLUTION

TECHNICAL FIELD

The subject specification relates generally to controller binding and in particular to altering a binding dependent upon a modified controller.

BACKGROUND

Industrial control environments can typically involve complex mechanical, electronic, electro-mechanical, and/or robotic machinery that perform various automated mechanical and/or electrical functions. Such machinery can include industrial motors, pumps, conveyors, escalators, drills, refrigeration systems, and so on, that can provide a particular physical output. Typically, an industrial environment utilizes one or more control devices to determine when to activate or deactivate such machinery, as well as an appropriate level of activation, for instance (e.g., an amount of current to supply a variable input motor). Additionally, the control devices are associated with logical program code that can determine an appropriate time, degree, manner, etc., to operate such machinery based on various determinable circumstances (e.g., output of another device, reading of an optical sensor, electronic measurement such as current level in a device, movement or number of rotations of a device, and so on).

Different controls can be used to provide protective features in an industrial environment. If a user attempts to make a change upon the industrial environment, then various checks can take place to discover if a user is authorized to make the change, such as requesting the user to enter a username and password. In addition, the user can be provided various tools that can assist in making changes to the industrial environment, including providing a template to be used to make different modifications.

SUMMARY

The following discloses a simplified summary of the specification in order to provide a basic understanding of some aspects of the specification. This summary is not an extensive overview of the specification. It is intended to neither identify key or critical elements of the specification nor delineate the scope of the specification. Its sole purpose is to disclose some concepts of the specification in a simplified form as a prelude to the more detailed description that is disclosed later.

In a conventional control system, a user creates links between controllers or makes individual changes to links between controllers. However, changes made to one link, such as moving a component or altering a link, can create a plurality of inconsistencies in relation to other links that are dependent upon the changed link. A user making a change to a primary link keeps track of changes made and modifies related links based upon the changes. Thus, a user is responsible for tracking related changes, which can have a relatively high likelihood of being error prone. Moreover, making changes in related bindings can cause more changes in other bindings, thus a domino effect ensues.

The disclosed innovation allows for automatic resolution of dependent links upon a change to a primary link (e.g., altering a link or moving a link). Commonly, a distributed directory is used to ascertain information related to a control system that includes various link metadata. An obtainment component gathers information that relates to a change in a link. Based upon the gathered information, a correction component can resolve dependencies (e.g., secondary dependencies, tertiary dependencies, etc.) that originate from the change in the link. Various additional features can be implemented in practice of the disclosed innovation. For instance, the changed link as well as a resolved dependency can be brought online at about one time to minimize system errors or failures due to inconsistencies.

The disclosed innovation proceeds in a manner opposite of other research toward industrial control systems. Due to the complexity and importance of links in industrial control systems, it appears illogical to allow dependencies to be resolved automatically. However, through detailed processing, dependencies can be resolved with unexpectedly few errors. Moreover, use of a distributed directory to ascertain control system data concerning resolving dependencies can enable unexpected simplicity in information obtainment or binding resolution.

The following description and the annexed drawings set forth certain illustrative aspects of the specification. These aspects are indicative, however, of but a few of the various ways in which the principles of the specification can be employed. Other advantages and novel features of the specification will become apparent from the following detailed description of the specification when considered in conjunction with the drawings.

DETAILED DESCRIPTION

Figure 1:
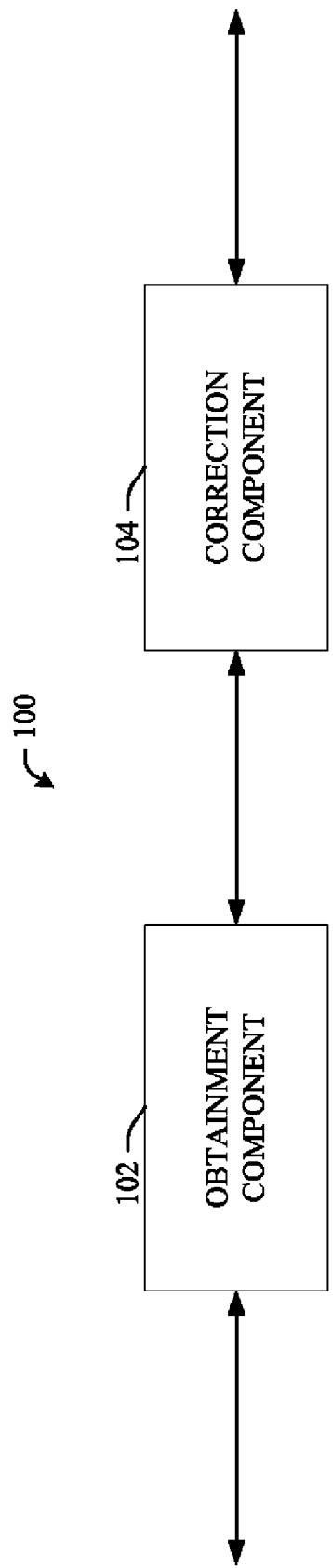
FIG. 1 illustrates a representative dependency resolution system in accordance with an aspect subject specification.

The claimed subject matter is now described with reference to the drawings, wherein like reference numerals are used to refer to like elements throughout. In the following description, for purposes of explanation, numerous specific details are set forth to provide a thorough understanding of the claimed subject matter. It can be evident, however, that the claimed subject matter can be practiced without these specific details. In other instances, well-known structures and devices are shown in block diagram form to facilitate describing the claimed subject matter.

As used in this application, the terms "component," "module," "system," "interface," or the like are generally intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a controller and the controller can be a component. One or more components can reside within a process and/or thread of execution and a component can be localized on one computer and/or distributed between two or more computers. As another example, an interface can include I/O components as well as associated processor, application, and/or API components.

Furthermore, the claimed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer readable electronic data such as those used in transmitting and receiving electronic mail or in accessing a network such as the Internet or a local area network (LAN). Of course, those skilled in the art will recognize many modifications can be made to this configuration without departing from the scope or spirit of the claimed subject matter.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to disclose concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. It is to be appreciated that inferences or determinations made through practice of the disclosed innovation can be practiced through implementation of artificial intelligence techniques.

As used herein, the terms to "infer" or "inference" refer generally to the process of reasoning about or deducing states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. While aspects of the subject specification relate to industrial control systems, aspects can be applied to other system types.

Now referring to FIG. 1, an example system 100 is disclosed for resolving dependencies automatically in an industrial control system. Common industrial control systems have a plurality of controllers (e.g., modules) that communicate with one another to perform various processes. In an example industrial system where soda is made, different controllers can have relationships that allows for mixing, bottling, packaging, testing, and the like.

The disclosed innovation automatically corrects bindings that are dependent on a changed binding. An obtainment component 102 can collect metadata related to a change in a controller relationship (e.g., a binding with another controller). Example metadata includes what change is being made, dependent bindings that are likely to be impacted from the change, a party making a change, etc. The change in the controller relationship can be alteration of an existing relationship, creation of a new relationship (e.g., through adding a new controller), exterminating a relationship, and the like. A correction component 104 can resolve a dependent relationship (e.g., collateral binding that is reliant upon the controller relationship) based at least in part upon the collected metadata as a function of the change in the controller relationship. A change in the controller relationship can place the dependent relationship in a state of error such that a resolution should take place (e.g., a failure is relatively likely to occur unless there is a resolution). The correction component 104 can analyze at least a portion of the collected metadata to identify the dependent relationship and determine a solution to correct the dependent relationship.

The system 100 can operate in an iterative manner such that multiple operations are made by the obtainment component 102 or correction component 104. For instance, a user can make a change in a relationship and the changed relationship is designated a primary binding. The correction component 104 can modify relationships affected by the change in the primary binding. However, changing affected relationships can lead to other inconsistencies. Thus, the changed affected relationship becomes the primary binding and the correction component 104 makes modifications appropriate for resolution of newly created deficiencies.

Moreover, in traditional control systems a binding is made at a hardware or control system level. In an illustrative example, Controller A desires information from Controller B to perform certain operations. The disclosed innovation enables a user to utilize a logical or application hierarchy to define a problem (e.g., Controller A cannot perform certain operations with data from Controller B). The user can assign different logical portions to physical controllers and thus the assignments become bindings. Logical to physical binding can be done at run time or late binding. Practice of the disclosed innovation provides relatively high flexibility to move logical components from one physical controller to another.

The obtainment component 102 can function as a means for retaining metadata of a binding among a primary component and a supplemental component in a directory (e.g., a distributed directory). The correction component 104 can operate as a means for automatically resolving the binding when the primary component moves from a first location to an auxiliary location in an industrial control system through utilization of the retained metadata. According to one embodiment, the first location and the auxiliary location are physical entities.

Figure 2:
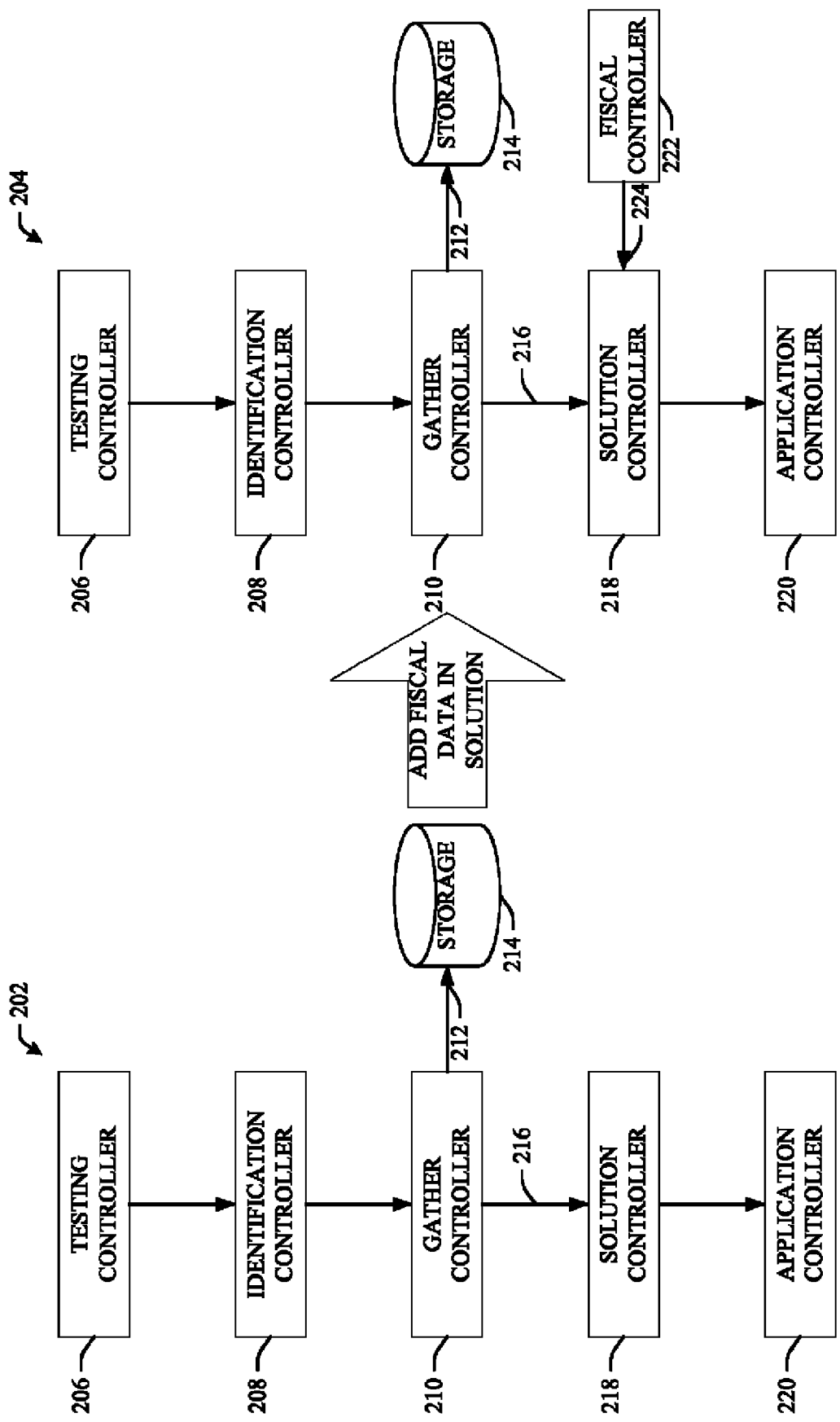
FIG. 2 illustrates a representative control system implementations in accordance with an aspect subject specification.

Now referring to FIG. 2, example industrial control system implementations 202 and 204 are disclosed. Implementation 202 discloses an 'original' implementation that operates prior to a binding change. A testing controller 206 can bind with an identification controller 208 such that test results can be sent (e.g., status of various system mixers). The identification controller 208 can identify a bowl that failed the test and bind with a gather controller 210 that allows a notice to pass of the failing bowl. The gather controller 210 can have two bindings, a binding 212 to storage 214 that gathers information relevant to a solution (e.g., previous solutions made) and a binding 216 with a solution controller 218 that receives gathered information and determines a solution for a best result. The solution controller 218 can bind with an application controller 220 to instruct how a repair can be carried out.

In implementation 202, operation can take place such that a best solution is rendered. For instance, a bowl failure can be that a certain level of cleanliness is not maintained in the bowl. Two solutions can be available, cleaning the bowl with chemical A that kills about 99.98% of bacteria or solution B that kills about 99.92% of bacteria, where application of either chemical eliminates a bowl cleanliness failure. Since chemical A produces a superior result (e.g., kills more bacteria), then it can be selected for use by the solution controller 218.

However, it is possible that chemical A costs substantially more then chemical B, while differences in application results are considered negligible. Therefore, a company can desire to modify operation such that fiscal considerations are taken into account when producing a solution. A user can add a fiscal controller 222 to the implementation 204, thus creating a 'modified' implementation. A binding 224 (e.g., primary binding) can take place between the fiscal controller 222 and the solution component 218 that enables financial constraints to be taken into account when determining a solution. The addition of the fiscal controller 222 and subsequent binding 224 with the solution controller 218 can influence bindings between other entities. For instance, for proper operation the gather controller 210 will gain and transfer money data as well as solution data. The obtainment component 102 of FIG. 1 can collect information concerning the binding 224, such a notice that the fiscal controller 222 is added, estimations on how other bindings are impacted, etc. The correction component 104 of FIG. 1 can change binding 212 such that monetary information is gathered and binding 216 that transfers the monetary information.

According to an alternative embodiment, a user can describe an application using a logical or physical hierarchy. For example, through use of a logical hierarchy the user can build the fiscal controller 222 as a logical application component. The user can manually bind the logical application component to at least one physical application server, such as the solution controller 218, where the solution controller 218 implements as hardware. Dependant bindings can be created upon the fiscal controller 222 and metadata concerning these bindings can be stored in a directory (e.g., a distributed directory).

The user can desire to move the fiscal controller 222 to another location. For instance, the fiscal controller 222 can be removed from connection with the solution controller 218 and bind with the gather controller 210 (e.g., the gather controller 210 implements as hardware). The disclosed innovation can automatically configure dependant bindings though use of the distributed directory. In an illustrative instance, the application controller 220 can behave a dependency upon the fiscal controller 222 when the fiscal controller 222 binds with the solution controller 218. When the fiscal controller 222 is removed and re-added, the distributed directory can be used to create a binding between the application controller 220 and the gather controller 210. However, it is to be appreciated that the fiscal controller 222 can implement along different controllers (e.g., a portion upon the solution component 218 and a portion upon the storage 214) and movement of a portion can lead to automatic resolution of bindings so the fiscal controller can operate properly.

Figure 3:
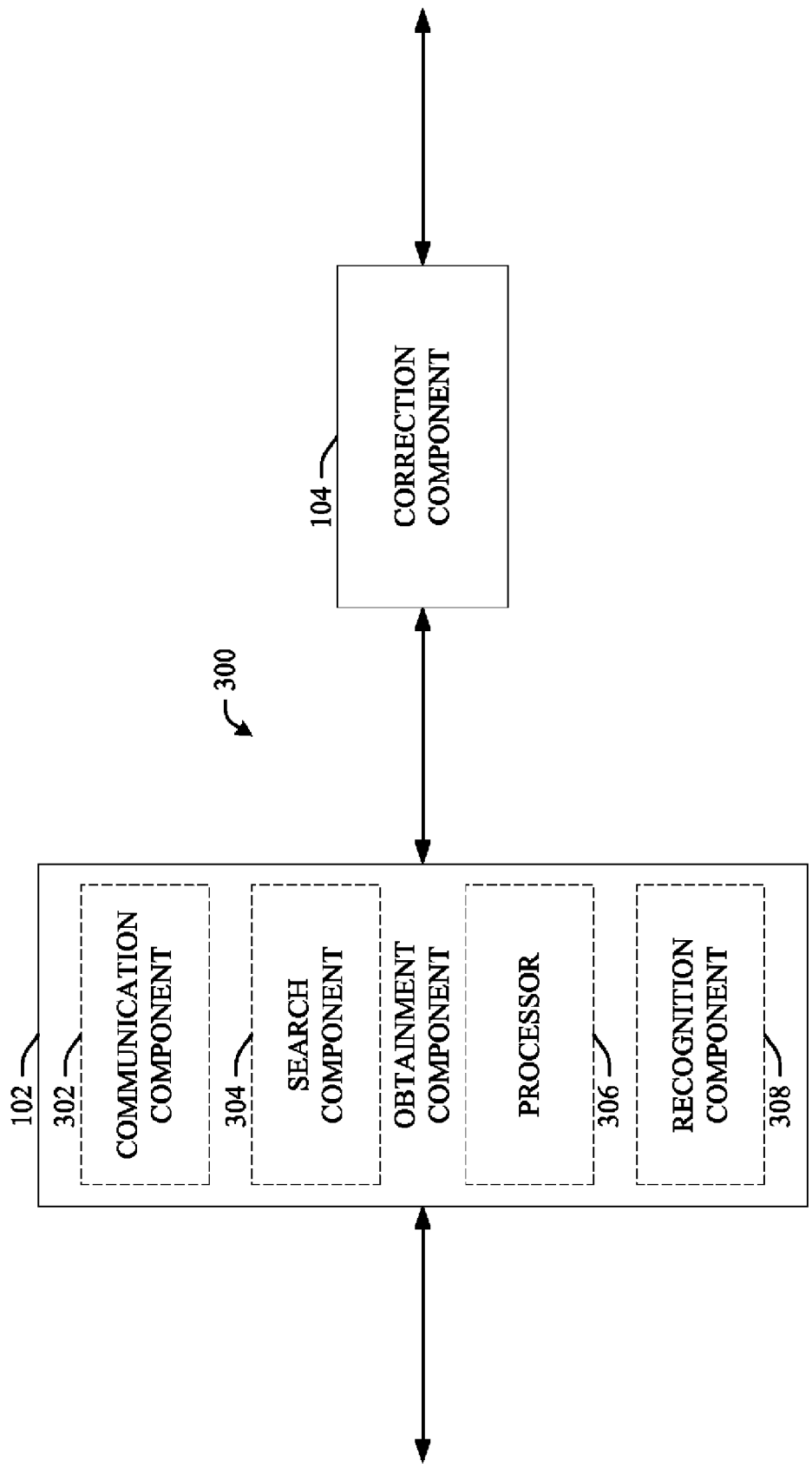
FIG. 3 illustrates a representative dependency resolution system with a detailed obtainment component in accordance with an aspect subject specification.

Now referring to FIG. 3, an example system 300 is disclosed for automatically correcting binding dependencies in an industrial control system with a representative detailed obtainment component 102. A communication component 302 can engage with other components (e.g., controllers) to transfer information, such as to send a request for information, receiving information, etc. Operation can take place wirelessly, in a hard-wired manner, employment of security technology (e.g., encryption), etc. Moreover, the communication component 302 can utilize various protective features, such as performing a virus scan on collected data and blocking information that is positive for a virus.

A search component 304 can locate different sources, such as controllers, storage and the like from which information can be obtained. Some industrial control systems can be continually changing, with various modules being added and removed. The search component 304 can perform continuous checks to determine locations of different sources as well as relationships between the sources. Moreover, a local network map can be retained of known sources as well as source relationships; a check can be periodically made to update the map.

A processor 306 can perform a variety of functions upon collected information. For instance, bindings in an industrial control system can be marked and monitored for changes. As a change in a binding takes place, the processor can analyze the change according to different factors, such as content of the change (e.g., why a change is being made).

A recognition component 308 can identify at least one relationship that is dependent upon the change in the controller relationship. Commonly, analysis results are used to make an identification of an impacted relationship. For example, if a change is made in a soda creating process that a higher carbonated soda water is to be used (e.g., a relationship between a supply controller and mixing controller), then the recognition component 308 can identify a packaging relationship can be impacted (e.g., a relationship between a packaging controller and supply controller that a stronger packaging should be used).

Collected information such as identified relationships can transfer to a correction component 104 that resolves a dependent relationship based at least in part upon the collected metadata as a function of the change in the controller relationship. Commonly, at least one identified dependent relationship (e.g., identified by the recognition component 308) is resolved by the correction component 104.

Figure 4:
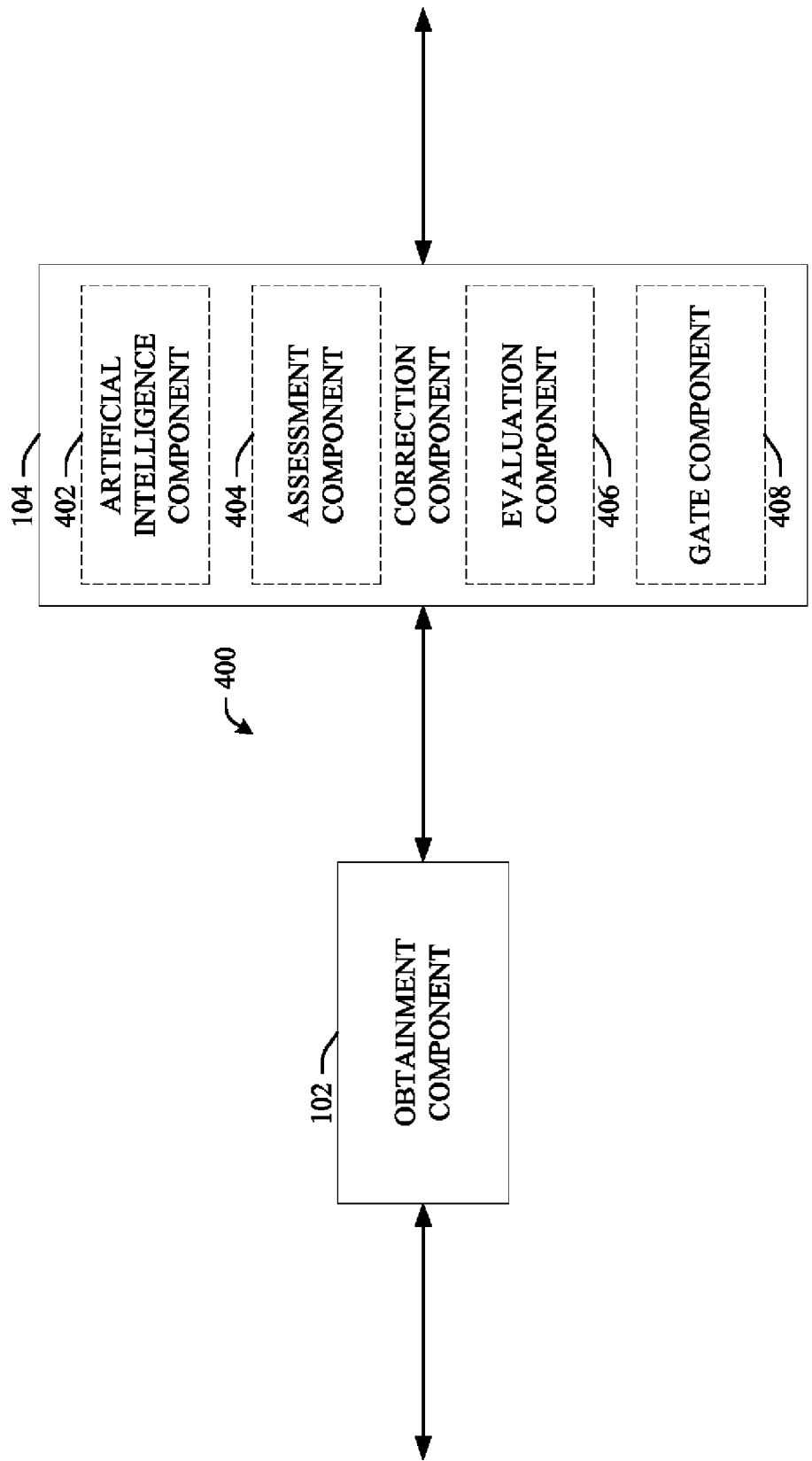
FIG. 4 illustrates a representative dependency resolution system with a detailed correction component accordance with an aspect subject specification.

Now referring to FIG. 4, an example system 400 is disclosed for automatically correcting binding dependencies in an industrial control system with a representative detailed correction component 104. An obtainment component 102 can collect metadata related to a change in a controller relationship. Collected metadata can transfer to a correction component 104 that resolves a dependent relationship based at least in part upon the collected metadata as a function of the change in the controller relationship.

An artificial intelligence component 402 can make various determinations or inferences in relation to metadata collection or dependent relationship resolution. For instance, the artificial intelligence component 402 can determine when a change is taking place upon a relationship and what other relationships are influenced by the change. In addition, the artificial intelligence component 402 can infer manners in which to resolve the dependency. Moreover, the artificial intelligence component 402 can implement a decision (e.g., modify a dependent binding in accordance with a change in a primary binding, create a new binding, delete an existing binding, etc.), such that the dependent relationship is resolved (e.g., no longer in error, no longer inconsistent with a primary binding, etc.).

The artificial intelligence component 402 can employ one of numerous methodologies for learning from data and then drawing inferences and/or making determinations related to applying a service (e.g., Hidden Markov Models (HMMs) and related prototypical dependency models, more general probabilistic graphical models, such as Bayesian networks, e.g., created by structure search using a Bayesian model score or approximation, linear classifiers, such as support vector machines (SVMs), non-linear classifiers, such as methods referred to as "neural network" methodologies, fuzzy logic methodologies, and other approaches that perform data fusion, etc.) in accordance with implementing various automated aspects described herein. Methods also include methods for the capture of logical relationships such as theorem provers or more heuristic rule-based expert systems.

An assessment component 404 can test the resolved dependent relationship. For instance, complex analysis can be performed to determine if the resolved dependent relationship is consistent with a change in a primary relationship. In an illustrative example, the resolution can take place prior to completion of the change (e.g., a user is making two changes, and resolution takes place after a first change), thus the resolution becomes inconsistent. According to one embodiment, the correction component 104 does not resolve the dependent relationship until a change in the controller relationship is finished.

An evaluation component 406 can analyze the result of the test to learn information concerning the binding. In an example analysis, an industrial control system is represented in a computer model and predicted outcomes are produced of various scenarios. Based upon the predicted outcomes, an inference can be made if a resolution is successful.

A gate component 408 can cancel the dependent relationship resolution and instruct the correction component 104 to re-resolve the dependent relationship. The cancellation can include deleting the dependent relationship, restoring a previous dependent relationship, placing a marker that the dependent relationship should be replaced, etc.

Figure 5:
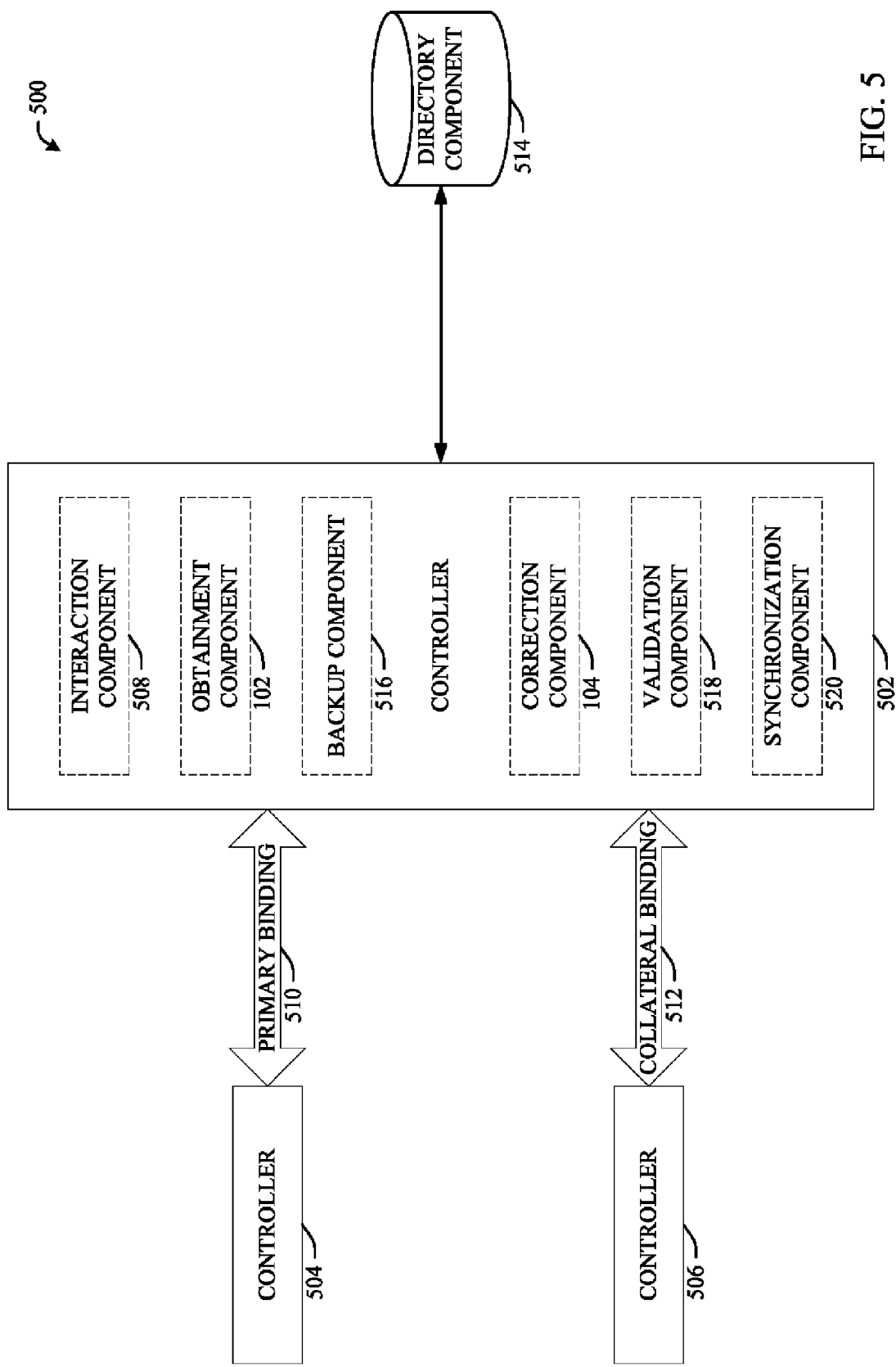
FIG. 5 illustrates a representative controller with various bindings in accordance with an aspect subject specification.

Now referring to FIG. 5, an example system 500 is disclosed highlighting various aspects that can be practiced with regard to the disclosed innovation. A controller 502 is shown having relationships (e.g., bindings) with two different controllers 504 and 506. A user can make requests through an interaction component 508 to modify operation of the system 500, such as a controller relationship. The user can manipulate a relationship between the controllers 502 and 504 such that the relationship becomes a primary binding 510 (e.g., a binding intentionally changed, a binding directly changed, etc.). The controllers 502-506 can be interrelated, such that a relationship between controllers 502 and 506 is influenced by the primary binding 510 and becomes a collateral binding 512. Designations 'primary' and 'collateral' can be loose designations that are applied based upon how a user interacts with controllers.

For instance, controller 504 can supply usernames and passwords to controller 502. In kind, the controller 506 accesses the usernames and passwords from controller 502. However, it can be automatically detected that there are security problems with controller 502 and a change can be implemented such that the controller 504 stops supplying passwords to controller 502. Thus, the collateral binding 512 is impacted since passwords can no longer be gathered from controller 502.

An obtainment component 102 can gather information that relates to the change in the primary binding 510. For instance, the obtainment component 102 can learn what the change is, an entity making a change, and the like. Moreover, the obtainment component 102 can identify relationships likely to be impacted by a change (e.g., the collateral binding 512) through utilization of the recognition component 308 of FIG. 3.

A directory component 514 can retain data related to an industrial control system structure. For instance, the directory component 514 can hold information related to addresses of different controllers, existing relationships between controllers, capabilities of controllers, etc. The obtainment component 102 can extract information from the directory component 514 and retain the data in storage. Different pieces of information, such as obtained information, component operating instructions (e.g., of the search component 304 of FIG. 3), location of the directory component 514, etc. can be held on storage (e.g., local, remote, etc.) of the controller 502. Storage can be arranged in a number of different configurations, including as random access memory, battery-backed memory, hard disk, magnetic tape, etc. Various features can be implemented upon storage, such as compression and automatic back up (e.g., use of a Redundant Array of Independent Drives configuration).

According to one embodiment, the directory component 514 can implement as a distributed directory (e.g., in part, in whole, etc.). The distributed directory is a set of services similar to a telephone book that allows for management of an industrial control system. Information located in the distributed directory is stored in other location, such as local storage of a controller. The distributed directory can configure as an ordered collection of searchable keys (e.g., names and addresses) used to locate information and services.

A distributed directory allows controllers to advertise different services to other controllers. For instance, if a mixer is not being used, then the mixer can advertise availability though the distributed directory. Commonly, there is not a single point of failure such that an industrial control system can operate with a node failure. Moreover, the distributed directory can grow and change based upon different relationships and controllers available. For instance, a request can be made to the distributed directory (e.g., directory component 514) by the obtainment component 102 for controllers that use password information of the controller 502. The distributed directory can return a system name for controller 506 as well as metadata of controller 506 (e.g., a relative address of controller 506, an absolute address of controller 506, a path for the controller 502 to reach controller 506, and the like).

A backup component 516 can retain information of a controller state before a change, such as a change in a relationship with another controller. Using the example where passwords are transferred between controllers 502-506, the backup component 516 can hold data concerning an industrial control system prior to a relationship modification. Details can be held such that the collateral binding 512 allows password information to transfer between the controllers 502 and 506 if a failure occurs.

A correction component 104 can attempt to make a dependency resolution (e.g., modification to the collateral binding 512) such that password information no longer passes to the controller 506 from the controller 502. For example, a new relationship can be created directly between controller 504 and controller 506. However, operation of the controller 506 can be modified such that certain operations are eliminated since passwords can no longer be obtained. According to one embodiment, the correction component 104 resolves the dependent relationship at runtime (e.g., during execution of operations related to the system 500, such as while the controllers 502-506 are operating).

A validation component 518 can authenticate the change in the controller 502 (e.g., modification of the primary binding), where a dependent relationship (e.g., the collateral binding 512) is not resolved unless the change is authenticated. In an illustrative instance, the correction component 104 can attempt to make an illegal change (e.g., a change from a non-approved person or entity, a change that would cause a system failure, etc.). According to one embodiment, if a change is not authenticated (e.g., by the validation component 518), then a controller (e.g., relationships of the controller 502, the controller itself, and the like) is reinstated through the retained information (e.g., the collateral binding 512 is extracted from the backup component 516 and placed in a former location, such as between controllers 502 and 506).

A synchronization component can activate a controller relationship (e.g., the primary binding 510) and the dependent relationship (e.g., the collateral binding 512) at about an equal time. Thus, relationships can 'come online' at one time, which lowers system error risk since inconsistent relationships are not 'online' at one time. In one configuration, the synchronization component 520 activates at least two relationships at about an equal time (e.g., at a single time within a tolerance), where there are two relationships or more than two relationships.

While bindings are disclosed as connecting through controllers, it is to be appreciated that non-connected implementations can be practiced. For example, in a soda making example, controller A can have a relationship with Mixer B and controller C has a relationship with Mixer D. If a relationship between Controller A and Mixer B is changed such that Mixer D is not able to operate while Mixer B operates (e.g., the relationship allows Controller A to supply more power to Mixer B), then the relationship between Controller C and Mixer D can be changed.

In one implementation, the obtainment component 102 can evaluate contents of the directory component 514, commonly configured as a distributed directory. Based upon an evaluation result, a suggestion can be made on how to resolve a deficient relationship (e.g., a dependent relationship to be resolved). Therefore, the obtainment component 102 can configure as a means for analyzing a distributed directory to determine a manner in which to change a supplemental binding that becomes less effective from an alteration to a primary binding.

The correction component 104 can resolve the deficient relationship (e.g., the collateral binding 512) based upon the suggestion. The correction component 104 can have testing capabilities to determine if a suggested manner can be implemented, should be implemented, and the like. The correction component 104 can function as a means for implementing the determined manner upon the supplemental binding.

Figure 6:
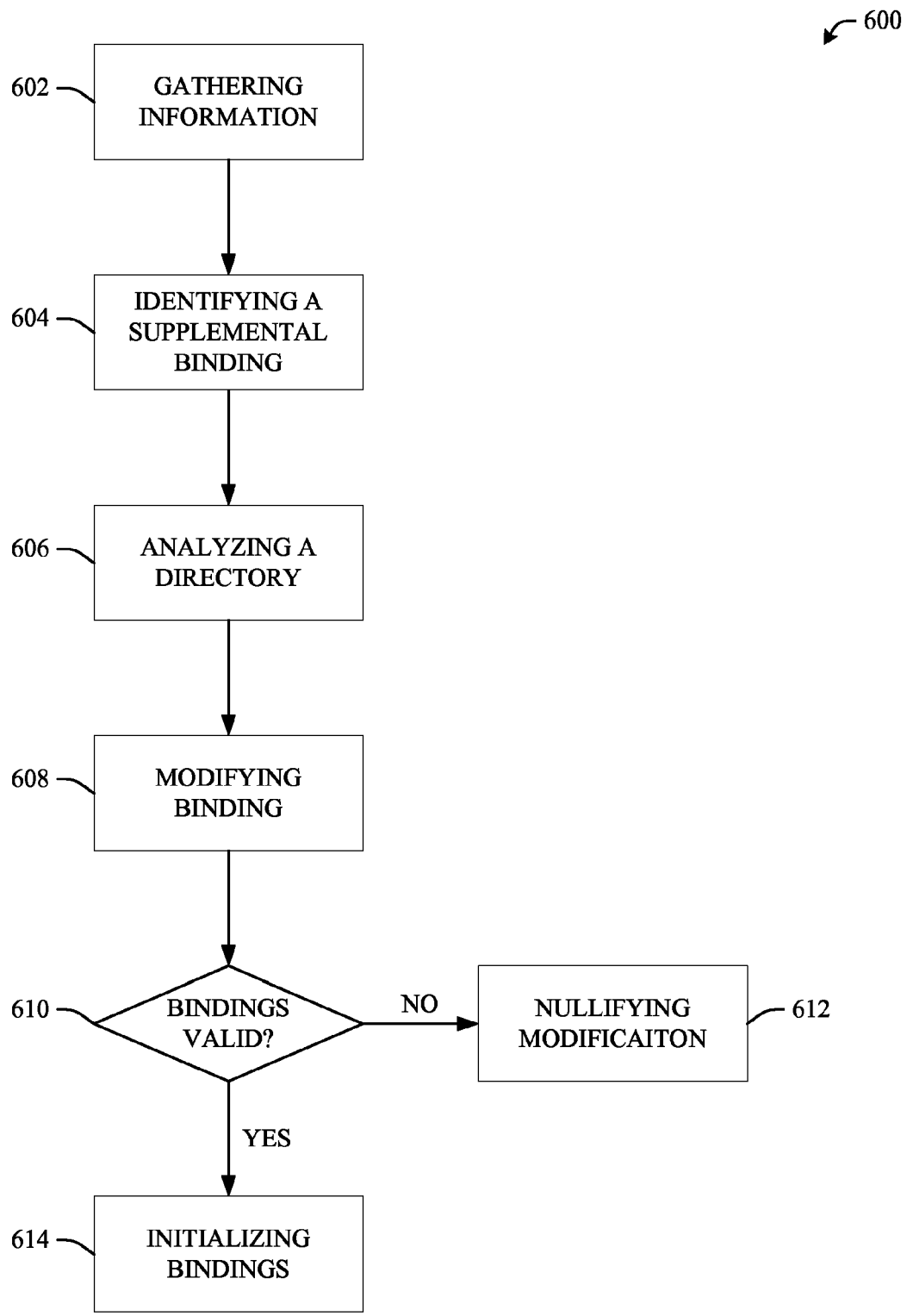
FIG. 6 illustrates a representative methodology for correcting erroneous bindings of an industrial control system in accordance with an aspect subject specification.

Now referring to FIG. 6, an example methodology 600 is disclosed for changing erroneous bindings between modules that result from a modification of a primary binding. A relatively large number of controllers can interconnect in an industrial controller configuration through relationships with one another. At block 602, information related to the configuration can be obtained through measurement, collecting history, user input, and the like. Specially, there can be gathering information that relates to the alteration of a primary binding. Alteration of the primary binding can be creating of the primary binding, such as bindings created by adding a new controller (or implemented through re-attachment of a controller) generated automatically, from a user, etc.

At event 604, bindings that become erroneous (e.g., become inconsistent) are identified. Identification can take place through primary binding analysis, evaluation of a configuration model, error checking (e.g., determining problems that occur once a change is implemented), and the like. According to one embodiment, the gathered information is used to identify the supplemental binding that becomes at least partially erroneous.

At action 606, there can be analyzing a directory, where the directory is oftentimes a distributed directory. Analysis can include constructing a configuration model, making requests to the directory on relevant bindings, and the like. Results produced from the directory can be verified for accuracy or consistency (e.g., such as testing against measured information).

An erroneous binding can be modified to an at least partially correct state at event 608. For instance, all erroneous factors can be corrected; however, modifications can take place where some deficiencies remain (e.g., a failure that has a low likelihood of occurrence can remain if correction would consume a relatively high amount of resources). In an example implementation, a result of directory analysis can be used in modifying the supplemental binding such that the supplemental binding is no longer erroneous. However, it is to be appreciated that directory analysis does not need to take place and event 604 can directly flow to event 606.

A check 610 can take place to determine if a supplemental binding is adequately corrected. Thus, check 610 can function to validate the primary binding modification or the supplemental binding modification. According to one embodiment, tests are run upon changed bindings to determine if a change is proper (e.g., a failure is not expected to occur). If a binding (e.g., primary, supplemental, etc.) is not valid, then the modification can be nullified (e.g., deleted) at act 612. As a part of the nullification, the binding can be re-modified (e.g., the methodology can return to event 608).

Modified bindings (e.g., supplemental bindings, primary bindings, and the like) that are considered valid can be initialized (e.g., placed 'online' as an active part of a configuration) at block 614. According to one embodiment, initiating the altered primary binding and modified supplemental binding can take place at about one time. For instance, they can be brought 'online' at exactly one time or within a time window (e.g., within about one second of one another).

Figure 7:
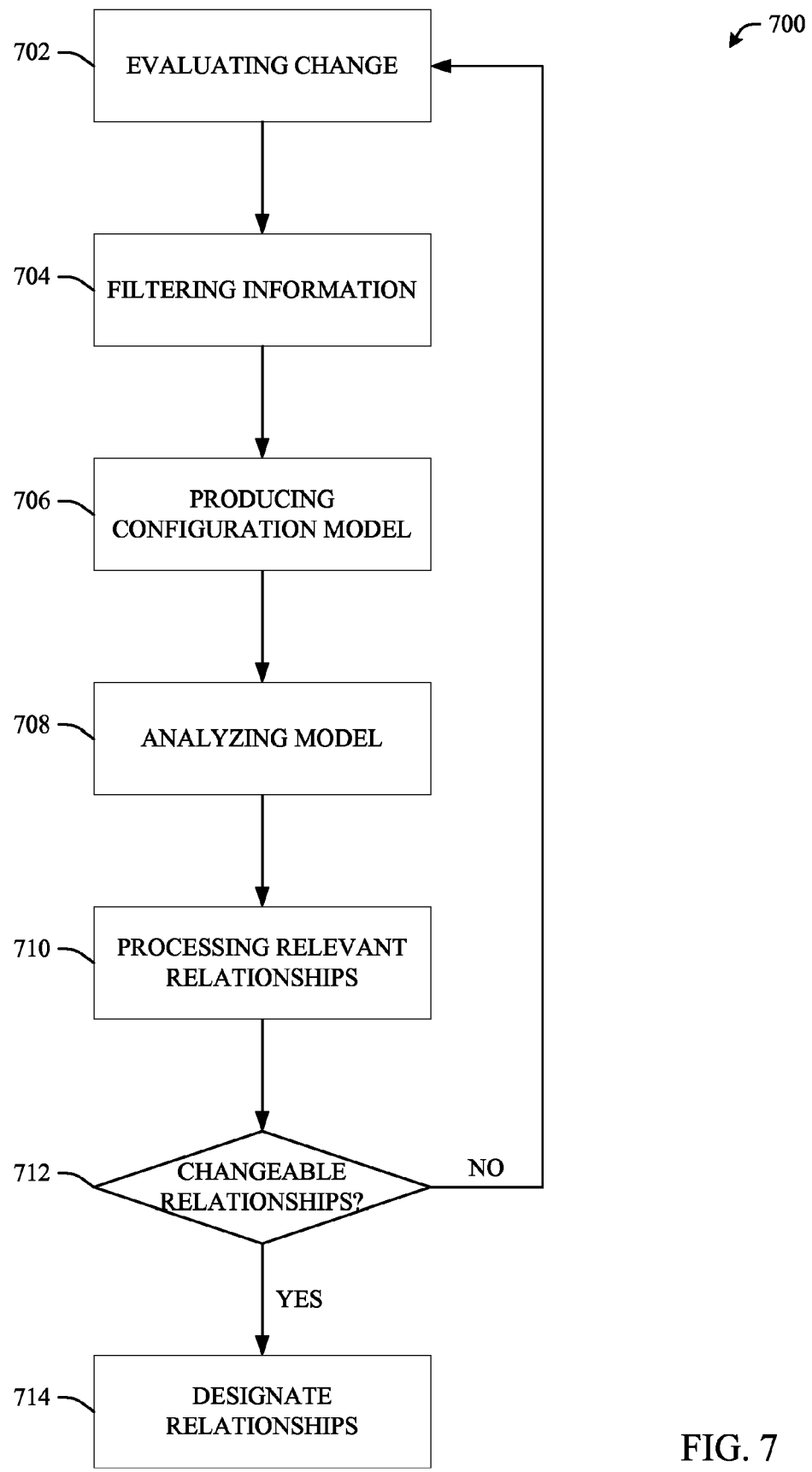
FIG. 7 illustrates a representative erroneous binding identification methodology for practice in an industrial control system in accordance with an aspect subject specification.

Now referring to FIG. 7, an example methodology 700 is disclosed for identifying a supplemental binding that is at least partially erroneous through alteration of a primary binding. The methodology 700 can be used as an example implementation of event 604 of FIG. 6. At action 702, a change in a primary binding can be evaluated, commonly in relation to how the change influences other bindings.

A relatively large amount of information can be collected (e.g., at block 606, through primary binding change evaluation) such that vast amounts of resources are used and performance suffers. Therefore, there can be filtering of information at action 704 to assist in lowering aforementioned difficulties. For instance, keyword searches can be performed to identify highly relevant information, information from specific sources can pass, etc.

At block 706, a configuration model can be produced that represents how controllers engage one another through bindings. Production of the model can include generation of the model as well as extraction of a retained model. For instance, information in a distributed directory can be used to build a model that is accessible for the methodology 700.

The model can be analyzed at action 708 to learn of different relationships affecting different controllers. Analysis can produce various results, such as relevant relationships (e.g., in view of evaluation results produced at action 702) concerning a change in a primary binding. Relevant relationships can be processed at action 710 such that determinations are made as to bindings that are erroneous. For instance, tests can be performed upon the configuration model and failures can be identified. In addition, change in the primary binding can be processed in order to determine if there are impacted relationships.

A check 712 can occur that determines if an erroneous relationship can be corrected at least in part. If a binding cannot be corrected, then the methodology 700 can return to action 702 to evaluate other changes in the configuration and continuously determine if a relationship can be corrected. If the relationships can be changed, then erroneous supplemental bindings can be designated at event 714.

Figure 8:
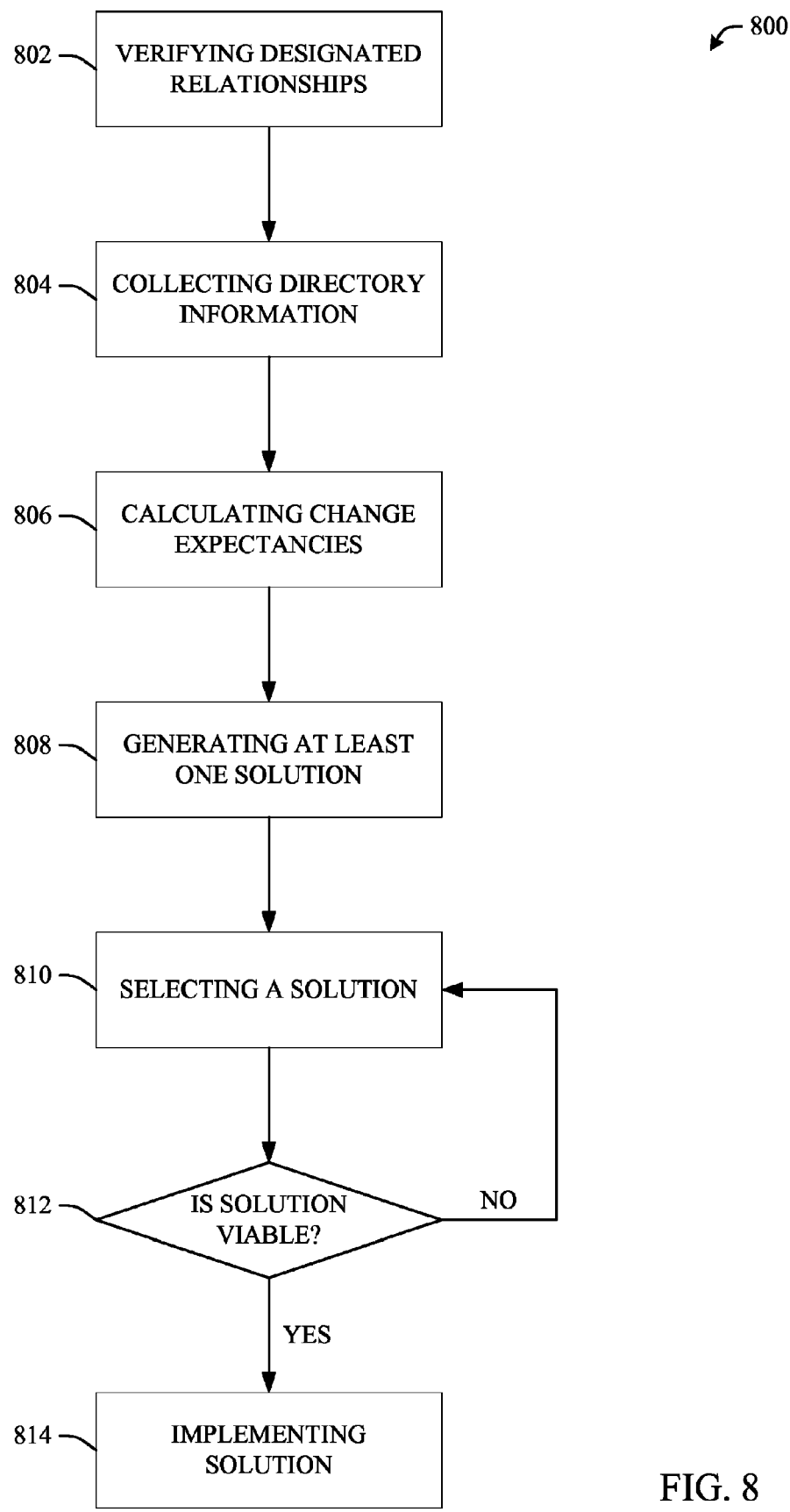
FIG. 8 illustrates a representative methodology for supplemental binding correction in an industrial control system in accordance with an aspect subject specification.

Now referring to FIG. 8, an example methodology 800 is disclosed for modifying the supplemental binding such that the supplemental binding is no longer erroneous. The methodology 800 can be used as an example implementation of event 608 of FIG. 6. Available modifications include creating bindings, deleting bindings, replicating bindings, changing bindings, and the like. Relationships designated for modification (e.g., designated at event 714 of FIG. 7) can be verified at action 802. Verification can determine if a change should take place as well as how changes can be implemented.

Information related to a configuration can be collected from a distributed directory at action 804. According to one embodiment, collection of directory information includes obtaining a configuration model. The information can be downloaded from a directory, copied into local storage, and the like. Other information can be collected, such as information collected at block 602 of FIG. 6.

Change expectancies can be calculated at act 806, commonly based upon collected information. A change in a primary binding can have a variety of different results and action 806 can determine or estimate the results. For example, a change in a binding between a mixing controller and ingredient controller can be calculated to have an impact upon a packaging controller. Act 806 can determine that a change in a mixing controller relationship will affect a supplemental relationship.

One or more solutions to an erroneous supplemental binding can be produced at action 808. In an example implementation of the methodology 800, a primary binding can allow a first controller to send data to a second controller. Two supplemental bindings can exist; a first supplemental binding that transmits the data from the second controller to a third controller and a second supplemental binding that has a fourth controller gain the data from the first controller.

The primary binding can be altered such that the second controller no longer receives the data; therefore, the first supplemental binding is erroneous since the second controller can no longer supply the data. A first solution can be generated to modify the first supplemental binding such that a relationship with the first controller is made. In addition, the first supplemental binding can be modified such that data is gathered from the fourth controller. A solution can be selected at event 810, such as through determining a solution that consumes a minimum amount of resources or selected randomly.

A check 812 can take place to determine if selected solution is viable. For instance, the fourth controller can overload if a new binding is create with it, so the solution can be considered unviable. If the solution is unviable, then the methodology 800 can return to event 810; other actions are available, such as terminating a modification if a viable solution cannot be discovered. If a selected solution is viable, then it can be implemented at act 814.

For purposes of simplicity of explanation, methodologies that can be implemented in accordance with the disclosed subject matter were shown and described as a series of blocks. However, it is to be understood and appreciated that the claimed subject matter is not limited by the order of the blocks, as some blocks can occur in different orders and/or concurrently with other blocks from what is depicted and described herein. Moreover, not all illustrated blocks can be required to implement the methodologies described hereinafter. Additionally, it should be further appreciated that the methodologies disclosed throughout this specification are capable of being stored on an article of manufacture to facilitate transporting and transferring such methodologies to computers. The term article of manufacture, as used, is intended to encompass a computer program accessible from any computer-readable device, carrier, or media.

Figure 9:
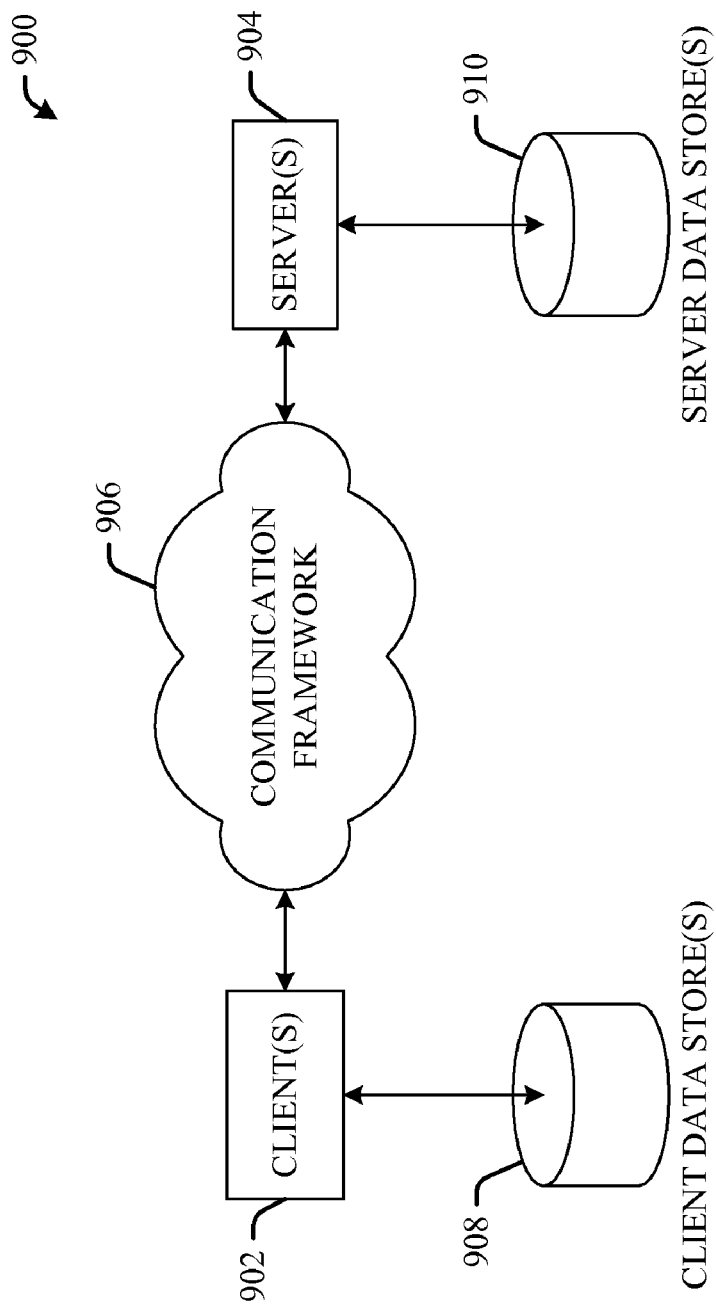
FIG. 9 illustrates an example of a schematic block diagram of a computing environment in accordance with an aspect subject specification.
Figure 10:
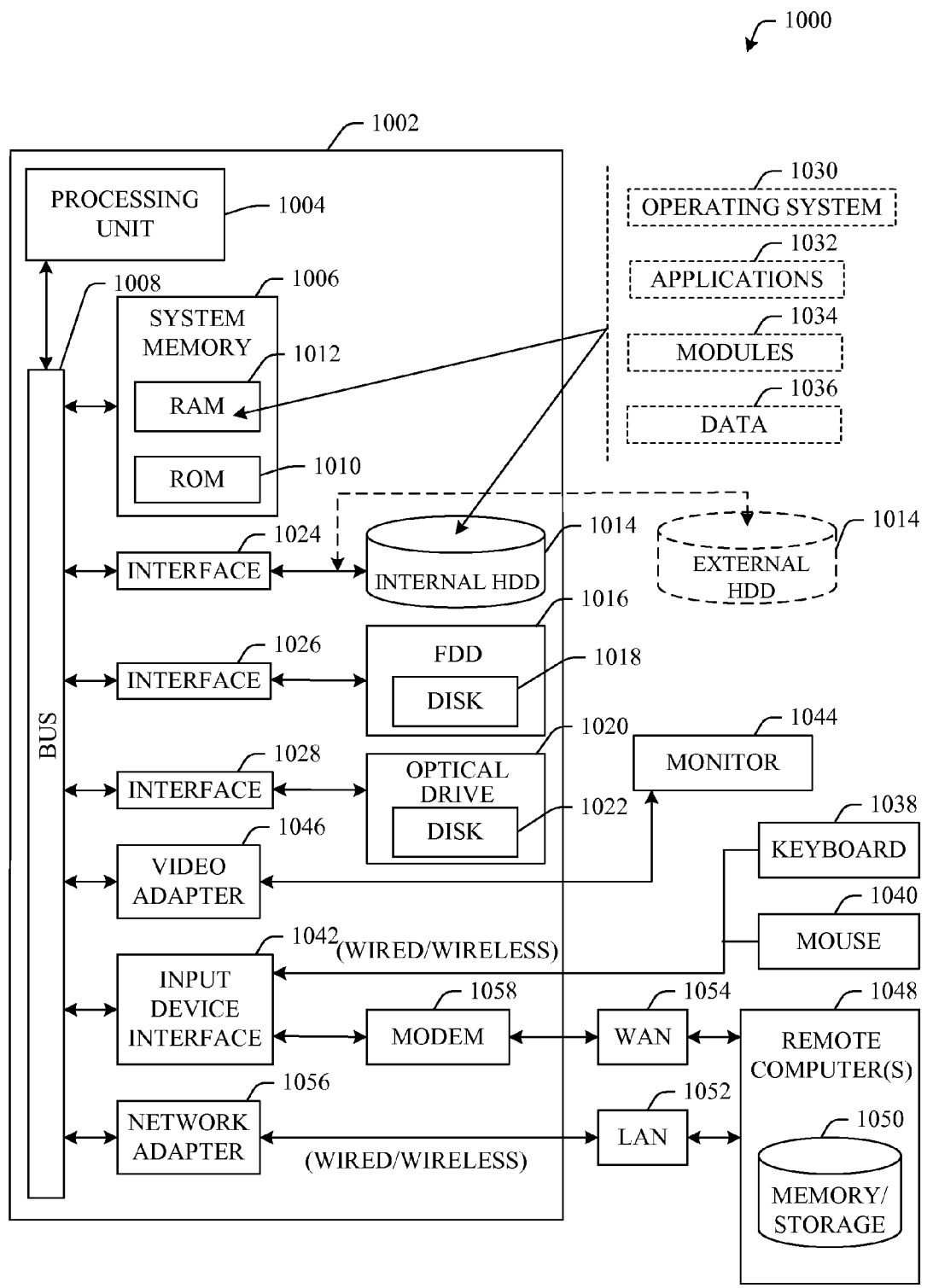
FIG. 10 illustrates an example of a block diagram of a computer operable to execute the disclosed architecture.

In order to provide a context for the various aspects of the disclosed subject matter, FIGS. 9 and 10 as well as the following discussion are intended to provide a brief, general description of a suitable environment in which the various aspects of the disclosed subject matter can be implemented. While the subject matter has been described above in the general context of computer-executable instructions of a program that runs on one or more computers, those skilled in the art will recognize that the subject matter described herein also can be implemented in combination with other program modules. Generally, program modules include routines, programs, components, data structures, etc. that perform particular tasks and/or implement particular abstract data types. Moreover, those skilled in the art will appreciate that the inventive methods can be practiced with other computer system configurations, including single-processor, multiprocessor or multi-core processor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. The illustrated aspects can also be practiced in distributed computing environments where tasks are performed by remote processing devices that are linked through a communications network. However, some, if not all aspects of the claimed subject matter can be practiced on stand-alone computers. In a distributed computing environment, program modules can be located in both local and remote memory storage devices.

Referring now to FIG. 9, there is illustrated a schematic block diagram of a computing environment 900 in accordance with the subject specification. The system 900 includes one or more client(s) 902. The client(s) 902 can be hardware and/or software (e.g., threads, processes, computing devices).

The client(s) 902 can house cookie(s) and/or associated contextual information by employing the specification, for example.

The system 900 also includes one or more server(s) 904. The server(s) 904 can also be hardware and/or software (e.g., threads, processes, computing devices). The servers 904 can house threads to perform transformations by employing the specification, for example. One possible communication between a client 902 and a server 904 can be in the form of a data packet adapted to be transmitted between two or more computer processes. The data packet can include a cookie and/or associated contextual information, for example. The system 900 includes a communication framework 906 (e.g., a global communication network such as the Internet) that can be employed to facilitate communications between the client(s) 902 and the server(s) 904.

Communications can be facilitated via a wired (including optical fiber) and/or wireless technology. The client(s) 902 are operatively connected to one or more client data store(s) 908 that can be employed to store information local to the client(s) 902 (e.g., cookie(s) and/or associated contextual information). Similarly, the server(s) 904 are operatively connected to one or more server data store(s) 910 that can be employed to store information local to the servers 904.

Referring now to FIG. 10, there is illustrated a block diagram of a computer operable to execute the disclosed architecture. In order to provide additional context for various aspects of the subject specification, FIG. 10 and the following discussion are intended to provide a brief, general description of a suitable computing environment 1000 in which the various aspects of the specification can be implemented. While the specification has been described above in the general context of computer-executable instructions that can run on one or more computers, those skilled in the art will recognize that the specification also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the specification can also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embody computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared and other wireless media. Combinations of the any of the above should also be included within the scope of computer-readable media.

With reference again to FIG. 10, the example environment 1000 for implementing various aspects of the specification includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors or proprietary specific configured processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes read-only memory (ROM) 1010 and random access memory (RAM) 1012. A basic input/output system (BIOS) is stored in a non-volatile memory 1010 such as ROM, EPROM, EEPROM, which BIOS contains the basic routines that help to transfer information between elements within the computer 1002, such as during start-up. The RAM 1012 can also include a high-speed RAM such as static RAM for caching data.

The computer 1002 further includes an internal hard disk drive (HDD) 1014 (e.g., EIDE, SATA), which internal hard disk drive 1014 can also be configured for external use in a suitable chassis (not shown), a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface 1028, respectively. The interface 1024 for external drive implementations includes at least one or both of Universal Serial Bus (USB) and IEEE 1394 interface technologies. Other external drive connection technologies are within contemplation of the subject specification.

The drives and their associated computer-readable media provide nonvolatile storage of data, data structures, computer-executable instructions, and so forth. For the computer 1002, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as Zip drives, magnetic cassettes, flash memory cards, cartridges, and the like, can also be used in the example operating environment, and further, that any such media can contain computer-executable instructions for performing the methods of the specification.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. It is appreciated that the specification can be implemented with various proprietary or commercially available operating systems or combinations of operating systems.

A user can enter commands and information into the computer 1002 through one or more wired/wireless input devices, e.g., a keyboard 1038 and a pointing device, such as a mouse 1040. Other input devices (not shown) can include a microphone, an IR remote control, a joystick, a game pad, a stylus pen, touch screen, or the like. These and other input devices are often connected to the processing unit 1004 through an input device interface 1042 that is coupled to the system bus 1008, but can be connected by other interfaces, such as a parallel port, an IEEE 1394 serial port, a game port, a USB port, an IR interface, etc.

A monitor 1044 or other type of display device is also connected to the system bus 1008 via an interface, such as a video adapter 1046. In addition to the monitor 1044, a computer typically includes other peripheral output devices (not shown), such as speakers, printers, etc.

The computer 1002 can operate in a networked environment using logical connections via wired and/or wireless communications to one or more remote computers, such as a remote computer(s) 1048. The remote computer(s) 1048 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1050 is illustrated. The logical connections depicted include wired/wireless connectivity to a local area network (LAN) 1052 and/or larger networks, e.g., a wide area network (WAN) 1054. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 is connected to the local network 1052 through a wired and/or wireless communication network interface or adapter 1056. The adapter 1056 can facilitate wired or wireless communication to the LAN 1052, which can also include a wireless access point disposed thereon for communicating with the wireless adapter 1056.

When used in a WAN networking environment, the computer 1002 can include a modem 1058, or is connected to a communications server on the WAN 1054, or has other means for establishing communications over the WAN 1054, such as by way of the Internet. The modem 1058, which can be internal or external and a wired or wireless device, is connected to the system bus 1008 via the input device interface 1042. In a networked environment, program modules depicted relative to the computer 1002, or portions thereof, can be stored in the remote memory/storage device 1050. It will be appreciated that the network connections shown are example and other means of establishing a communications link between the computers can be used.

The computer 1002 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

The aforementioned systems have been described with respect to interaction among several components. It should be appreciated that such systems and components can include those components or sub-components specified therein, some of the specified components or sub-components, and/or additional components. Sub-components can also be implemented as components communicatively coupled to other components rather than included within parent components. Additionally, it should be noted that one or more components could be combined into a single component providing aggregate functionality. The components could also interact with one or more other components not specifically described herein but known by those of skill in the art.

What has been described above includes examples of the subject specification. It is, of course, not possible to describe every conceivable combination of components or methodologies for purposes of describing the subject specification, but one of ordinary skill in the art can recognize that many further combinations and permutations of the subject specification are possible. Accordingly, the subject specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:
1. A system capable of implementation upon an industrial control configuration, comprising:
    an obtainment component that collects metadata related to a binding change in a controller relationship;
    a correction component that resolves at least one dependent relationship that depends from the controller relationship, wherein the at least one dependent relationship requires resolution based upon the binding change; and
    a synchronization component that makes active in the industrial control configuration the binding change and the resolved at least one dependent relationship within a time window tolerance of each other.

2. The system of claim 1, the correction component utilizes a directory component to resolve the at least one dependent relationship.

3. The system of claim 2, the directory component implements as a distributed directory.

4. The system of claim 1, resolution of the at least one dependent relationship takes place at runtime.

5. The system of claim 1, further comprising a recognition component that identifies at least one relationship that is dependent upon the binding change in the controller relationship, the at least one identified dependent relationship is resolved by the correction component.

6. The system of claim 1, further comprising a validation component that authenticates the binding change in the controller, wherein the correction component does not resolve the at least one dependent relationship unless the change is authenticated.

7. The system of claim 6, further comprising a backup component that retains information of a controller state before the binding change, if the binding change is not authenticated, then the controller is reinstated through the retained information.

8. The system of claim 1, further comprising an assessment component that tests a resolved dependent relationship.

9. The system of claim 8, further comprising an evaluation component that analyzes a result of the tests.

10. The system of claim 9, further comprising a gate component that cancels the tested dependent relationship resolution and instructs the correction component to re-resolve the resolved dependent relationship if the results of the tests indicate a failure.

11. The system of claim 1, the correction component examines the binding change in the controller relationship as a primary binding in order to resolve the at least one dependent relationship based at least in part upon the collected metadata, wherein the correction component resolves dependent relationships by iteratively:
  identifies dependent relationships to the primary binding,
  modifies dependent relationships that are affected by the change in the primary binding in order to correct the affected dependent relationships, and
examines each modified dependent relationship by treating the modified dependent relationship as the primary binding.

12. A method capable of implementation upon an industrial control configuration, comprising:
  determining if a supplemental binding is at least partially erroneous through alteration of a primary binding;
  modifying the supplemental binding such that the supplemental binding is no longer erroneous if the supplement binding is determined to be at least partially erroneous; and
  bringing online in the industrial control configuration the alteration of the primary binding and the modified supplemental binding at a substantially equal time.

13. The method of claim 12, further comprising analyzing a directory, a result of the analysis is used in modifying the supplemental binding such that the supplemental binding is no longer erroneous.

14. The method of claim 13, the directory is a distributed directory.

15. The method of claim 12, further comprising gathering information that relates to the alteration of the primary binding, the gathered information is used to identify the supplemental binding that becomes at least partially erroneous.

16. The method of claim 12, wherein modifying the supplemental binding such that the supplemental binding is no longer erroneous comprises:
  evaluating a plurality of solutions to correct the erroneous binding; and
  selecting a solution of the plurality of solutions that is determined to provide a best result.

17. The method of claim 12, further comprising validating the primary binding modification or the supplemental binding modification.

18. The method of claim 17, further comprising nullifying the primary binding alteration or the supplemental binding modification based upon a negative validation result.

19. The method of claim 12, alteration of the primary binding is creating of the primary binding.

20. A system capable of implementation upon an industrial control configuration, comprising:
  means for analyzing a distributed directory to determine a supplemental binding that causes an industrial process controlled by the industrial control configuration to become less effective from an alteration to a primary binding;
  means for determining a plurality of manners in which to change the supplemental binding to improve effectiveness of the industrial control process;
  means for selecting a manner of the plurality of manners that provides the most improvement in effectiveness of the industrial control process.

21. A system, comprising:
  means for retaining metadata of a binding among a primary component and a supplemental component in an online directory associated with an executing industrial control configuration controlling one or more industrial processes;
  means for automatically resolving the binding in real time in the online directory when the primary component moves from a first location to an auxiliary location in an industrial control system associated with the one or more industrial processes through utilization of the retained metadata.

22. The system of claim 21, the first location and the auxiliary location are physical entities.

23. The system of claim 21, the directory is a distributed directory.

24. The method of claim 12, modifying the supplemental binding such that the supplemental binding is no longer erroneous includes deleting a first supplemental binding that is erroneous and creating a second supplemental binding such that the second supplemental binding is not erroneous.

25. The method of claim 12, the supplemental binding that is at least partially erroneous includes when the supplemental binding is in failure according to at least one aspect, when the supplemental binding is no longer optimal, when the supplemental binding becomes unnecessary, or a combination thereof.

26. A computer program embodied upon a computer-readable storage medium comprising:
  program code for collecting metadata related to a runtime binding change in a controller relationship in an online industrial control configuration; and
  program code for resolving at least one dependent relationship that depends from the controller relationship, wherein the at least one dependent relationship requires resolution based upon the runtime binding change; and
  program code for activating in the online industrial control configuration the runtime binding change and the resolved at least one dependent relationship within a time window tolerance of each other.

* * * * *